(No Model.) 2 Sheets—Sheet 1.

L. E. PHELPS & R. K. SWIFT.
DISK HARROW.

No. 337,017. Patented Mar. 2, 1886.

Witnesses:
Leo. E. Curtis,
C. C. Linthicum.

Inventors:
Lyman E. Phelps,
R. K. Swift,
Banning & Banning,
Attorneys.

(No Model.) 2 Sheets—Sheet 2.
L. E. PHELPS & R. K. SWIFT.
DISK HARROW.
No. 337,017. Patented Mar. 2, 1886.
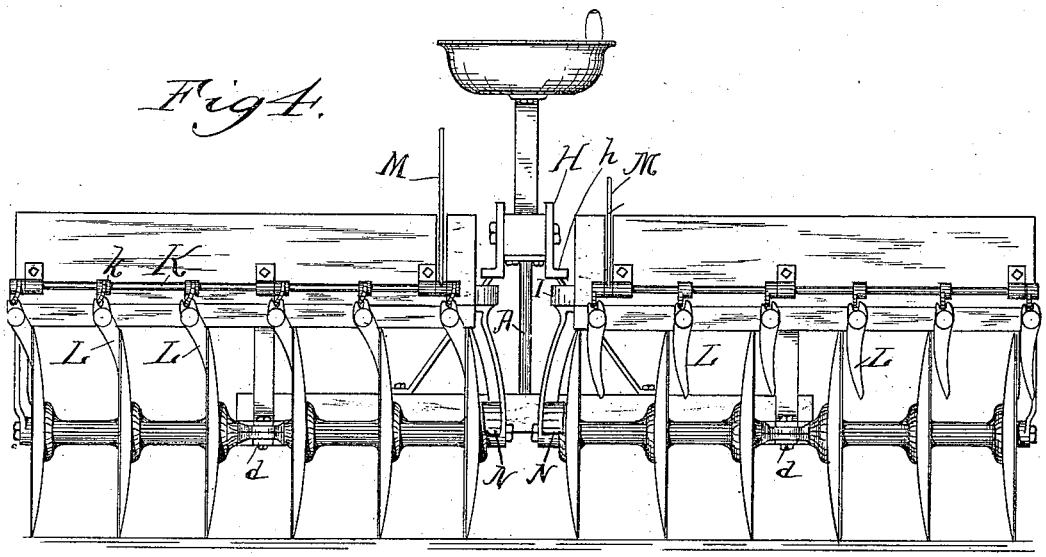
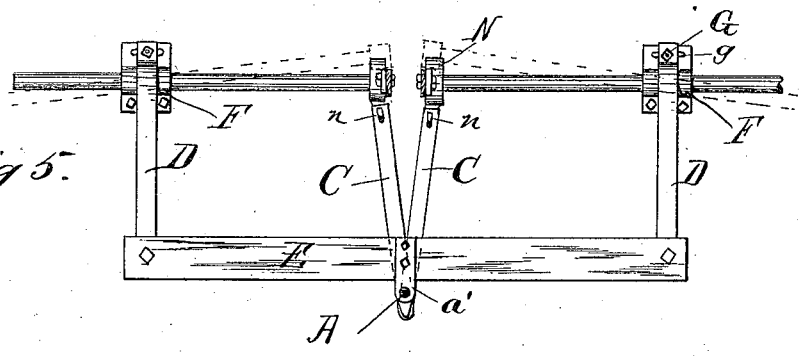
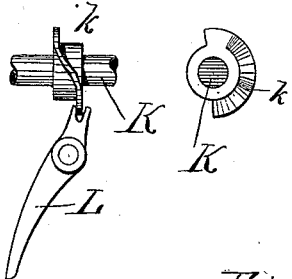
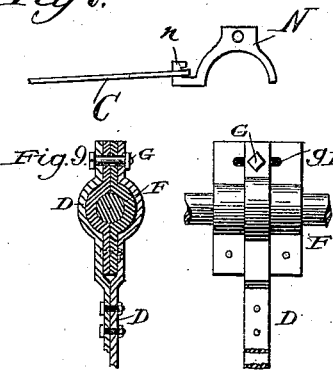
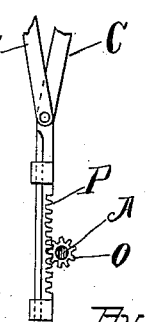
Witnesses:
Lew. E. Curtis,
C. C. Linthicum.
Inventors:
Lyman E. Phelps
R. K. Swift
By Banning & Banning.
Attorneys:

UNITED STATES PATENT OFFICE.

LYMAN E. PHELPS AND R. K. SWIFT, OF ROCHELLE, ILLINOIS, ASSIGNORS OF ONE-THIRD TO J. J. A. ZELLER, OF SAME PLACE.

DISK-HARROW.

SPECIFICATION forming part of Letters Patent No. 337,017, dated March 2, 1886.

Application filed July 19, 1884. Renewed January 4, 1886. Serial No. 187,637. (No model.)

*To all whom it may concern:*

Be it known that we, LYMAN E. PHELPS and R. K. SWIFT, citizens of the United States, residing at Rochelle, in the county of Ogle and State of Illinois, have invented certain new and useful Improvements in Disk-Harrows, of which the following is a specification.

The improvements which constitute our invention relate to devices for adjusting the gangs of the harrow to lines at different angles to the line of draft; to devices for preventing the inner ends of the gangs from rising out of the ground; to devices for operating the disk-scrapers; and to certain details of construction hereinafter particularly described and claimed.

The adjusting devices consist of a cranked rod combined with links or arms, the former being located within easy reach of the driver's seat, and the latter connecting the former with the inner ends of the gangs. This part of our invention also comprises devices for connecting the gang-axles with the draft-frame.

Our adjustable stops consist of arms having feet or equivalent devices, said arms being connected preferably to the tongue, which is free to move vertically independently of the gangs, and the feet or offsets of the arms being adapted to engage with a portion of the frame which moves only with the gangs. These stops also serve as bumpers to prevent contact of the inner ends of the axles of the two gangs.

The mechanism for operating the disk-scrapers comprises a rock-shaft having an actuating-lever and carrying a series of cam devices adapted to engage the scrapers and force them into contact with the disks, said scrapers being pivoted in such manner that they are readily deflected by said cams.

Figure 1:
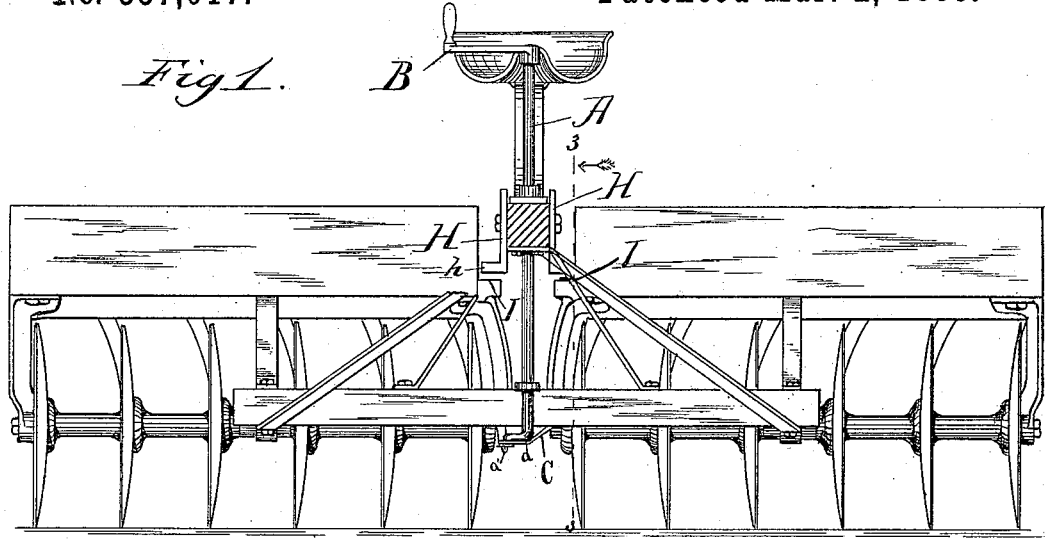
Figure 2:
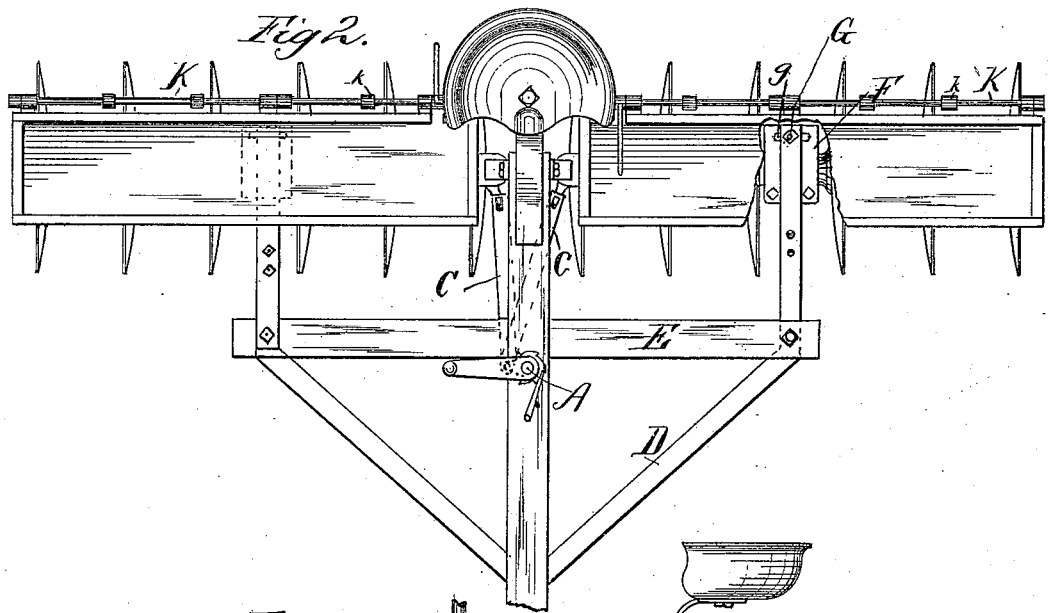
Figure 3:
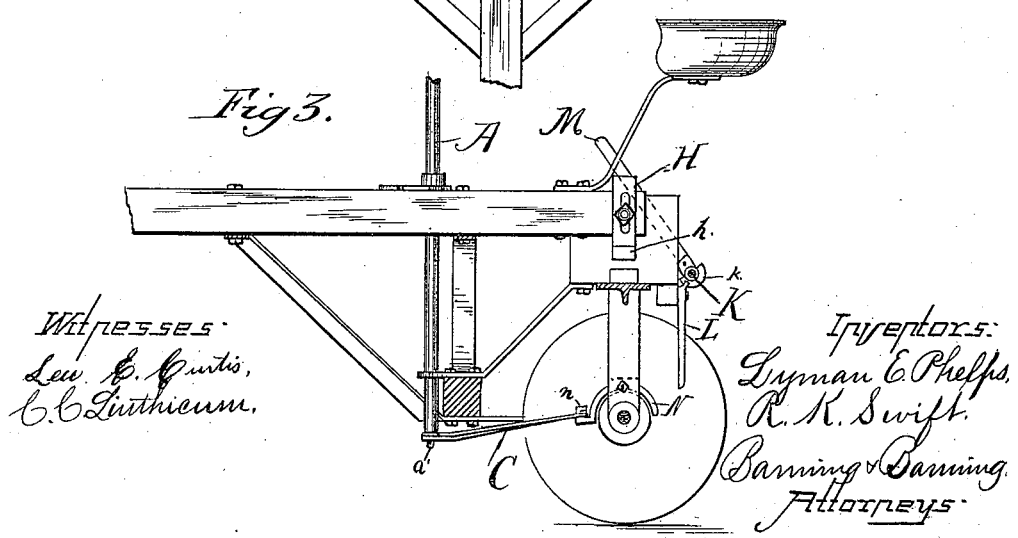

In the accompanying drawings, Figure 1 is a front elevation of a disk-harrow containing our improvements. Fig. 2 is a plan view of the same. Fig. 3 is a vertical section taken on the line 3 3 of Fig. 1, looking in the direction indicated by the arrow of that figure. Fig. 4 is a rear elevation of the machine intended to show particularly the devices for operating the disk-scrapers. Fig. 5 is a skeleton plan view of the adjusting devices, the gangs being shown in two positions. Fig. 6 is a detail view of one of the cam devices for operating the scrapers. Fig. 7 is a detail view of the devices for excluding the dirt from the axles and attaching the links thereto. Fig. 8 shows a modification of the adjusting devices. Fig. 9 is a sectional view, and Fig. 10 a plan view, of the slotted box, showing the connection of the draft-rods to the gang-axles.

The two gangs of disks are adjusted at any desired angle to the line of draft by means of an upright cranked shaft or rod, A, which is connected at its lower end to the forward ends of horizontal links or arms C C, the rear ends of said links being connected, respectively, to the inner ends of the gangs. The rod A, as shown in the drawings, passes through the tongue, but it may be secured upon or at one side of the tongue. The upper end of rod A is provided with a crank, B, by which it is operated. Rod A is bent for a portion of its length near its lower end, forming a crank, $a$, the pin of which, $a'$, is secured to the forward ends of the links C C. Instead of crank $a$, rod A may carry a pinion, O, which operates a rack-bar, P, connected with the links, as shown in Fig. 8.

In Fig. 7 we have shown a device for excluding the dirt from the bearings at the end of the axle. Such device consists of a casting, N, which is secured upon the hangers which support the inner ends of the axles and is cored out so as to incase the ends of the axles. These castings N have hooks $n$, which are received by the eyes of the rear ends of links C C.

As shown in Figs. 1 and 2, the crank $a$ and the axles of the gangs stand in lines at right angles to the line of draft. As rod A is operated, the gang-axles will be adjusted at an acute angle to the line of draft.

In Fig. 5 the gangs are shown in two positions.

The axles are connected through draft-rods D D directly to the tongue. Said rods are also secured to a transverse draft-bar, E, thus bracing and steadying the frame. We connect the draft-rods D to the axle by passing said rods over the axle and bolting a strap, $d$, on their under sides, said strap passing under the axle. Boxes F are fitted loosely to the axles of each gang at a point about the middle of their length, and are provided at their rear sides with an elongated slot, g. Each of these boxes is preferably about four inches in length, two in depth, and three in width, and the slotted hole therein about three inches or a little more in length and one-half an inch in width. A bolt, G, passes through said slot and through the ends of draft-rod D and strap d. The form of this joint connecting the draft-rods D and straps d to the axles through the boxes permits the gangs to vibrate at either end both vertically and horizontally, and also allows the gangs to shift endwise—that is to say, the nut securing the vertical bolt not being screwed down tightly there is sufficient looseness in the connection to permit the vibration stated, and the long slot in the box permits the endwise shifting.

The stops for preventing the inner disks of the gangs from raising out of the ground consist of pieces H, provided with feet h. A side view of these parts is given in Fig. 3. We prefer to construct said pieces of cast-iron, and to bolt one upon either side of the tongue, the feet h resting upon the top plank of the frame, as at I. It will result from this construction that the disks of the inner end of each gang will be prevented from raising out of the ground, and that they may play up and down freely, being limited only in their upward movement by this positive stop. These pieces H are provided preferably with a longitudinal slot or other means, whereby they may have a vertical adjustment, so that a regulated amount of play may be permitted to the gangs. The feet h are adapted, further, to bear against a fixed stop on the top plank, so as to prevent contact of the inner ends of the gang-axles.

The devices for operating the disk-scrapers are particularly shown in Figs. 4 and 6. Said devices consist of a rock-shaft, K, which may be carried in hangers upon the rear side of the top plank. This rock-shaft is provided with a series of cams, k. These cams are adapted to engage with and shift the disk-scrapers L, which are pivoted in such convenient manner as to be shifted and thrown into contact with the disks. The rock-shaft K is provided with operating-levers M, by means of which said shaft is rocked. The cams k, as shown in the drawings, are well adapted to shift the scrapers; but many forms of cam construction will readily suggest themselves to the builder.

We are aware of the Bayliss patent of January 6, 1874, reissued April 2, 1878, and the Norton patent of April 8, 1879; but neither of these patents shows our outwardly-projecting feet or other devices of similar construction and operation.

We claim—

1. In a disk-harrow, the combination of the draft-rods D D with the gang-axles and the transverse draft-frame, the draft-rods being loosely connected to the gang-axles by means of vertical bolts passing through slotted holes in the boxes F, substantially as described.

2. In a disk-harrow, the combination, with the tongue, of the adjustable stops H, provided with outwardly-projecting feet extending over the gang-frames to limit the upward movement of the inner ends of the same, and to prevent their coming into contact with each other, substantially as described.

3. In a disk-harrow, the combination of the rock-shaft K, carrying cam devices k, operating-lever M, and pivoted scrapers L, said scrapers being adapted to be pressed against the disks by means of said cams, substantially as described.

LYMAN E. PHELPS.
R. K. SWIFT.

Witnesses:
JOHN S. PHELPS,
W. H. YEARNSHAW.